United States Patent [19]
Feldman

[11] 3,877,200
[45] Apr. 15, 1975

[54] CAPPING DEVICE
[75] Inventor: Rubin Feldman, Ladue, Mo.
[73] Assignee: TSI, Inc., St. Louis, Mo.
[22] Filed: June 6, 1973
[21] Appl. No.: 367,485

[52] U.S. Cl. .......................... 53/67; 53/296; 53/329
[51] Int. Cl. .......................... B65b 57/02; B65b 7/28
[58] Field of Search ........ 53/67, 296, 297, 298, 329

[56] References Cited
UNITED STATES PATENTS

| | | | |
|---|---|---|---|
| 2,920,431 | 1/1960 | Izumi | 53/296 X |
| 3,099,115 | 7/1963 | McKibben et al. | 53/67 |
| 3,507,093 | 4/1970 | Marion | 53/296 X |
| 3,716,963 | 2/1973 | Amberg | 53/296 |

Primary Examiner—Travis S. McGehee
Attorney, Agent, or Firm—Polster and Polster

[57] ABSTRACT

An automated capping machine is provided which seals heat shrinkable film about the mouth of an open container. The machine has a pneumatically operated drive system which is actuated by container placement. On actuation, heat shrinkable film advances to a cutting and shrinking position and the container is raised to meet the film. Movement of the cup brings the film against a hot wire cutter and advances the film-cup combination to a heat shrink station. The heat shrink station is designed to protect that portion of the film covering container top while air is directed, by a unique system of baffles, along that portion of the container-wrap overlay where shrinking is desired.

19 Claims, 8 Drawing Figures

CAPPING DEVICE

BACKGROUND OF THE INVENTION

This invention relates to capping machines, and in particular to apparatus which shrink film about open containers. While the invention is described with particular detail in relation to drinking containers, or cups, those skilled in the art will recognize the wide applicability of this invention to other containers and film shrinking applications.

A number of container capping machines are known in the art. For example, the U.S. Pat. to Marion, No. 3,507,093, issued Apr. 21, 1970, and the references cited therein, disclose particular capping machine features in the field of this invention. This body of art in general, and Marion in particular, deals with capping machines designed to heat seal shrinkable film about a drinking cup, for example. While this body of prior art works well for its intended purpose, the machines commonly are complex and expensive to manufacture. In addition, the design of the heat shrinking station of these apparatus generally has been inefficient. Thus, machine output has been hindered because of the time required to shrink the film.

One of the objects of this invention is to provide a low cost capping machine.

Another object of this invention is to provide a fully automated, single cup capping device.

Yet another object of this invention is to provide an improved heat shrink chamber which will effectively seal an open mouth container in minimum time.

Yet another object of this invention is to provide a pneumatically operated capping device.

Other objects will be apparent to those skilled in the art in light of the following description and accompanying drawings.

SUMMARY OF THE INVENTION

In accordance with this invention, generally stated, an automatic capping machine is provided having a pneumatic drive system. The system is actuated by cup placement. Upon that placement, a pneumatic switch is energized which in turn activates a four-way pneumatic valve. The valve initiates a film feed and take up mechanism which, after a predetermined distance of travel, activates a cup advance and timer section of the drive system. As the cup advances, it engages the film wrap, which is automatically cut by hot wire cutter means. The cup continues to advance until a pressure differential between opposed air cylinders limits further movement. At stop, the cup is positioned in a shrink chamber. In the preferred embodiment, the shrink chamber is donut shaped and includes a unique baffle design which directs hot air upwardly toward the underside of the cup lip. The particular heat chamber described gives superior shrink capabilities to the apparatus of this invention because sealing is accomplished along the cup lip while the container top film overlay is protected against shrinkage. After a predetermined time period, the timer reverses the four-way valve which in turn permits reverse cup movement. Cup removal resets the pneumatic switch enabling the device for the next cycle of operation.

DESCRIPTION OF THE PREFERRED EMBODIMENT

Referring now to FIGS. 2-8, reference numeral 1 indicates the capping machine of this invention. Capping machine 1 generally is a skeleton structure having a first pair of parallel end members 2 and 3, a second pair of oppositely opposed parallel members 4 and 5, a pair of horizontal beams 6 and 7 and a second pair of parallel beam members 8 and 9. A top pair of parallel members 10 and 11 are connected between the members 2 and 4, 3 and 5, respectively. A pair of parallel bottom members 12 and 13 are parallel to top members 10 and 11 respectively and are structurally connected to the same horizontal members as their respective parallel top pair members. The structural members set forth above form a rectangular structure mounting the component parts of my apparatus. The members may be constructed from any suitable material. The machine 1 utilizes conventional steel or aluminum angle iron for the structural components delineated by the numerals 2 through 13. The structural members are joined at their ends by any conventional fastening means to form the rectangular structure illustrated in the drawings. Either conventional nut and bolt fasteners or conventional welding techniques work well. Reaches or suitable covering may be connected to the structural members if desired. Sheet metal works well for this purpose. In various embodiments of this invention, such covering is used to provide mounting areas for the components of the apparatus and to enhance overall machine appearance.

A cup platform 14 is mounted between the horizontal members 2 and 3 along a track 15. Track 15 may be any convenient structure sufficient to support the platform 14 along the members 2 and 3 and to permit raising and lowering of the platform 14 in response to operational commands as described hereinafter. Thus, the platform 14 may be attached to a support 108 which in turn has rollers 109 mounted on each end of it. The rollers 109 are carried in the track 15. The track 15, in the embodiment illustrated, is a U-shaped structure which carries the rollers 109. Other mounting arrangements for the platform 14 are available, as those skilled in the art will recognize.

Platform 14 includes a cup supporting surface 17, and a back wall 18 attached and perpendicular to supporting surface 17. Back wall 18 may be provided with a cup receiving crevice 19. Cup platform 14 is operatively connected to a drive means 20, shown in FIG. 8.

Figure 8:
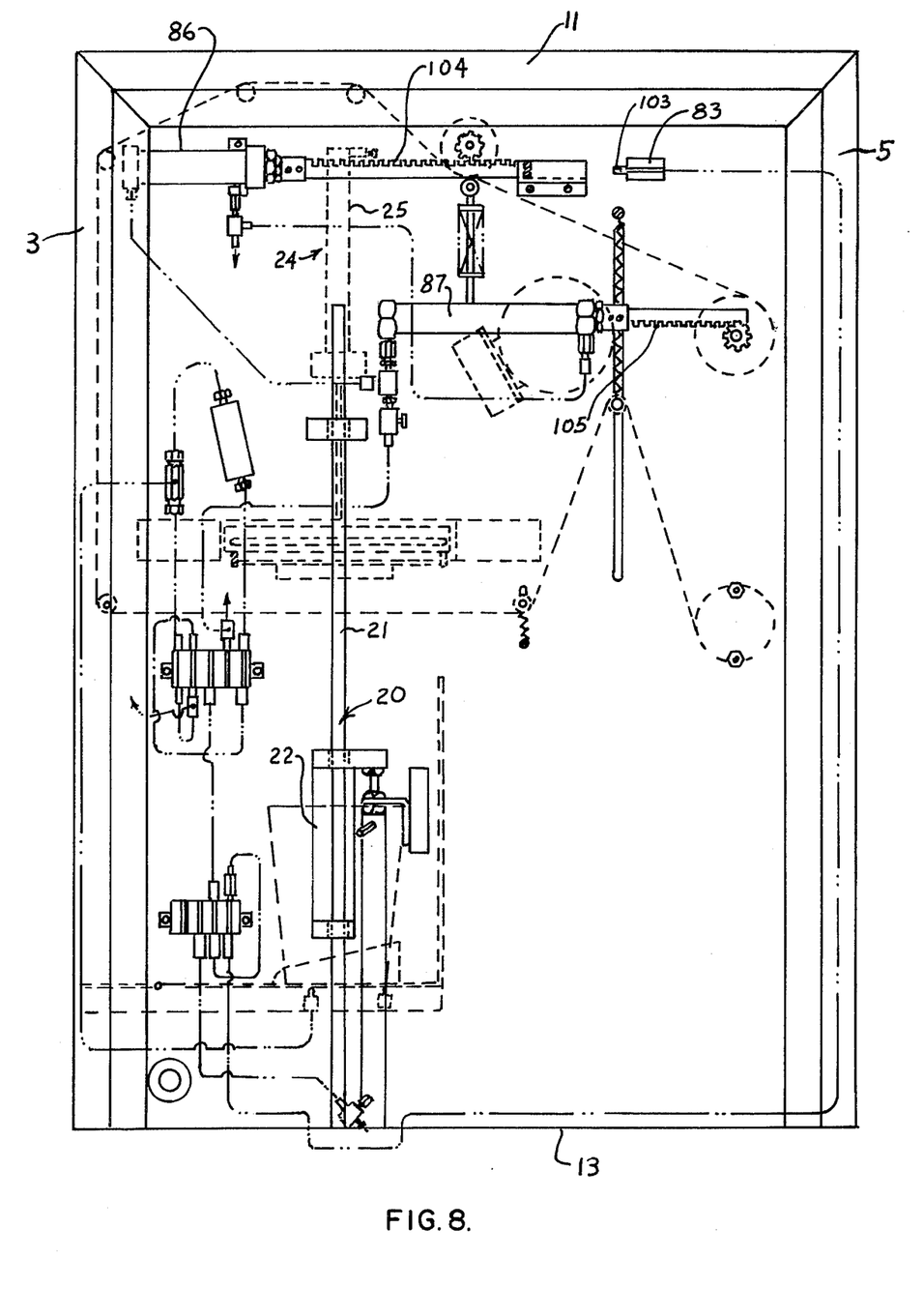
FIG. 8 is a view taken along the line 8—8 of FIG. 3.

Drive means 20 includes a piston 21 and a pneumatic cylinder 22. Drive means 20 is mounted to the capping machine 1 at any convenient location. The drive means 20 may be positioned to directly drive platform 14 or it may drive the support 108, for example.

A pressure responsive switch actuator 16 is operatively connected to the platform 14.

A heat shrink station 23 is positioned above cup platform 14 at approximately the uppermost distance of travel defined by track 15 and drive means 20. Heat shrink station 23 includes a stop means 24 having a cylinder 88 containing a piston 25 operatively arranged within the cylinder 88 along a first end of a rod 89. A second end of the rod 89 has a guard means 26 attached and a puncture means 38 operatively connected to it. Station 23 further includes a heat tunnel 27, wrap cutting means 28, blower means 29 and a fan 30.

Figure 7:
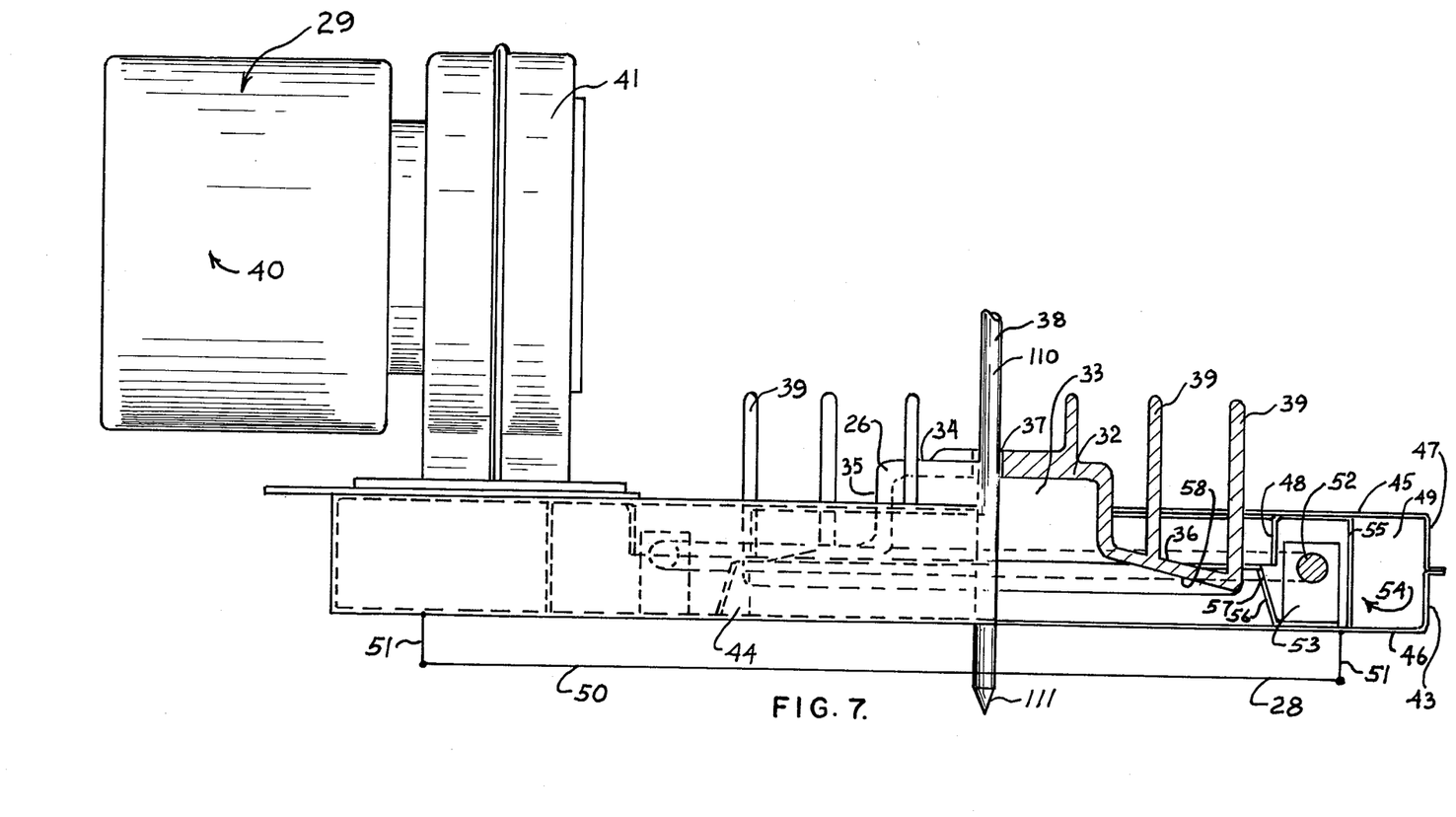
FIG. 7 is a sectional view taken along the line 7—7 of FIG. 6.

Guard means 26 is best shown in FIG. 7. The guard 26 is intended to protect the film layer covering the mouth or top of a cup 31 during film shrink operations. Guard 26 generally is a cylindrical section 32 defining a cup cavity 33. Cylindrical section 32 includes a top 34 and a generally cylindrical side wall 35. Side wall 35 has an integrally formed outwardly extending flange 36 extending from it along the edge of the side wall 35 opposite the side wall 35 connection to the top 34. Top 34 has an opening 37 in it through which puncture means 38 extends. Puncture means 38 is operatively connected to rod 89. Puncture means 38 generally has a cylindrical body portion 110 which terminates at a pointed end 111. In the operation of the machine 1 described hereinafter, puncture means 38 acts to relieve pressure, generated by a carbonated liquid, for example, on the film cap covering the cup by slitting a small opening in that covering. Both top 34 and flange 36 have a plurality of fins 39 extending upwardly from them. Fins 39 are conventional heat transfer methods for increasing the area of a given body that is available for heat transfer use. Because of its heat transfer application, guard 26 preferably is constructed of aluminum, but other metals or other materials have sufficient heat transfer characteristics may be utilized. The fan 30 is positioned to direct a volume of air across the guard 26 and the fins 39 during operation of the apparatus. Fan 30 may be any of a number of fan units commercially available.

Blower means 29 is conventional and includes an electric motor 40 arranged to drive a blower 41. Blower 41 has an output side 42 operatively connected to heat tunnel 27.

Heat tunnel 27, in the embodiment illustrated, is a cylindrical section 43 having an axial opening 44 through it such that the tunnel 27 assumes a donut shape. Cylindrical section 43 includes a top wall 45, a bottom wall 46, an outer side wall 47 and an interior side wall 48. Walls 45 through 48 may be constructed separately and later assembled to form the heat tunnel 27, or one or more of the walls may be formed integrally with another in the construction of the tunnel 27. The walls 45 and 46, and the walls 47 and 48 respectively, are concentric to and spaced rom one another, thereby defining a chamber 49 between them. Wrap cutting means 28 is mounted along the bottom wall 46 of heat tunnel 27 and preferably comprises a resistance wire 50 electrically connected to a source of electrical energy not shown. Wire 50 is mounted to the wall 46 along a plurality of mounting studs 51. The studs 51 also insulate the resistive wire 50 from the capping machine and in particular from the heat tunnel 27. Wire 50 generally defines a circular shape, having a diameter of sufficient size to permit passage of a variety of cup 31 sizes.

Mounted within chamber 49 is a heating element 52. Element 52 is a circular shaped element carried within the chamber 49 and insulated electrically from the tunnel 27. The element 52 is electrically connected to a source of electrical power not shown. The element 52 is supported within chamber 49 by a plurality of mounting means 53. Mounting means 53 may be any of a variety of commercially available fasteners. In the illustrated embodiment, means 53 comprise simple rectangular fasteners having an opening in them which receives and holds the element 52.

Also housed within chamber 49 is a baffle system 54. In the embodiment illustrated, baffle system 54 includes a wall 55 concentric with the side walls 47 and 48, extending from and between walls 45 and 46; and a radially inwardly extending vent 56 which opens through the interior side wall 48, partially extending into the opening 44. In the design of heat tunnel 27, the vent 56 may form a portion of the interior of side wall 48. Other designs also may be utilized. It is important, however, in the operation of the apparatus of this invention, that the vent 56 be arranged so that air, heated as it passes over element 52, will be directed upwardly toward the top 45 of the heat tunnel 27. The particular embodiment shown in FIG. 7 has the vent 56 attached to bottom 46. However, other constructions are envisioned such that the vent 56, for example, may form a curled wall which would open near bottom 46 and permit upward air movement by convection current. I find it convenient, in the embodiment illustrated, to open vent 56 into opening 44 approximately mid way along the axial length of the opening 44 as defined by the sides 47 and 48 of heat tunnel 27. It also should be noted that the flange 36 is designed to clear an end 57 of vent 56. The guard 26, in FIG. 7, is shown in a position defined for the purpose of this application, as the off condition of the apparatus. In that position, the flange 36 is below the end 57 of vent 56. In the operation of the apparatus, however, hydraulic pressure maintains the guard 26 positioned above the tunnel 27, when the machine 1 is not being cycled, so that the guard 26 is out of the heat zone of the apparatus. Open actuation of the machine 1, for example, when pressure responsive switch 16 is actuated by placing the cup 31 on platform 14, guard 26 moves down to a position approximately parallel to cutting means 28. The cup 31 on the platform 14 is engaged by the guard 26, as the platform 14 moves upwardly, and pushes guard 26 back through the heat tunnel 27 to a position above end 57 of vent 56. When so positioned, it may be observed that a lower surface 58 of flange 36 will direct the hot air expelled through vent 56 toward cup cavity 33. This in turn brings the heated air in contact with the film-cup combination at the lower lip conventionally found in such drinking containers, effectively sealing the film to the cup along that lip. This is one important feature of my invention.

Rotatably mounted between horizontal members 3 and 5 are a feed roller 60, a take up roller 59, a plurality of guide rollers 61, drive roller means 62 and 63, and tension setting means 64. Heat shrinkable film 66, in roll from, is inserted over the roller 60 and drawn between drive roller means 62 and 63. The film 66 further is drawn into a loop, best illustrated in FIG. 4, along the guide rollers 61, so as to position the film 66 between cutting means 28 and the cup 31. The film 66 also is drawn over tension setting means 64 and is attached to take up roller 59. Attachment may be accomplished in a variety of ways. A slot may be provided in the roller 60 to aid in attachment or the film merely may be lapped over itself, for example.

Tension setting means 64 may comprise a number of commercially available devices. A particularly low cost and effective tension setting means is utilized with machine 1. Thus, in the embodiment illustrated, means 64 includes an adjustable spring loaded tension bar 67 fastened to an enclosure panel 68. The panel 68 is mounted between members 3 and 5. The panel 68 has an oblong opening 69 through it, and the bar 67 is adjustably fastened through that opening. Adjustment may be accomplished merely by spring loading the bar 67, or a simple slidable fixture with a wing nut lock, for example, may be utilized to adjust the position of the bar 67 within the opening 69. Bar 67 functions to maintain the film 66 taut.

Figure 5:
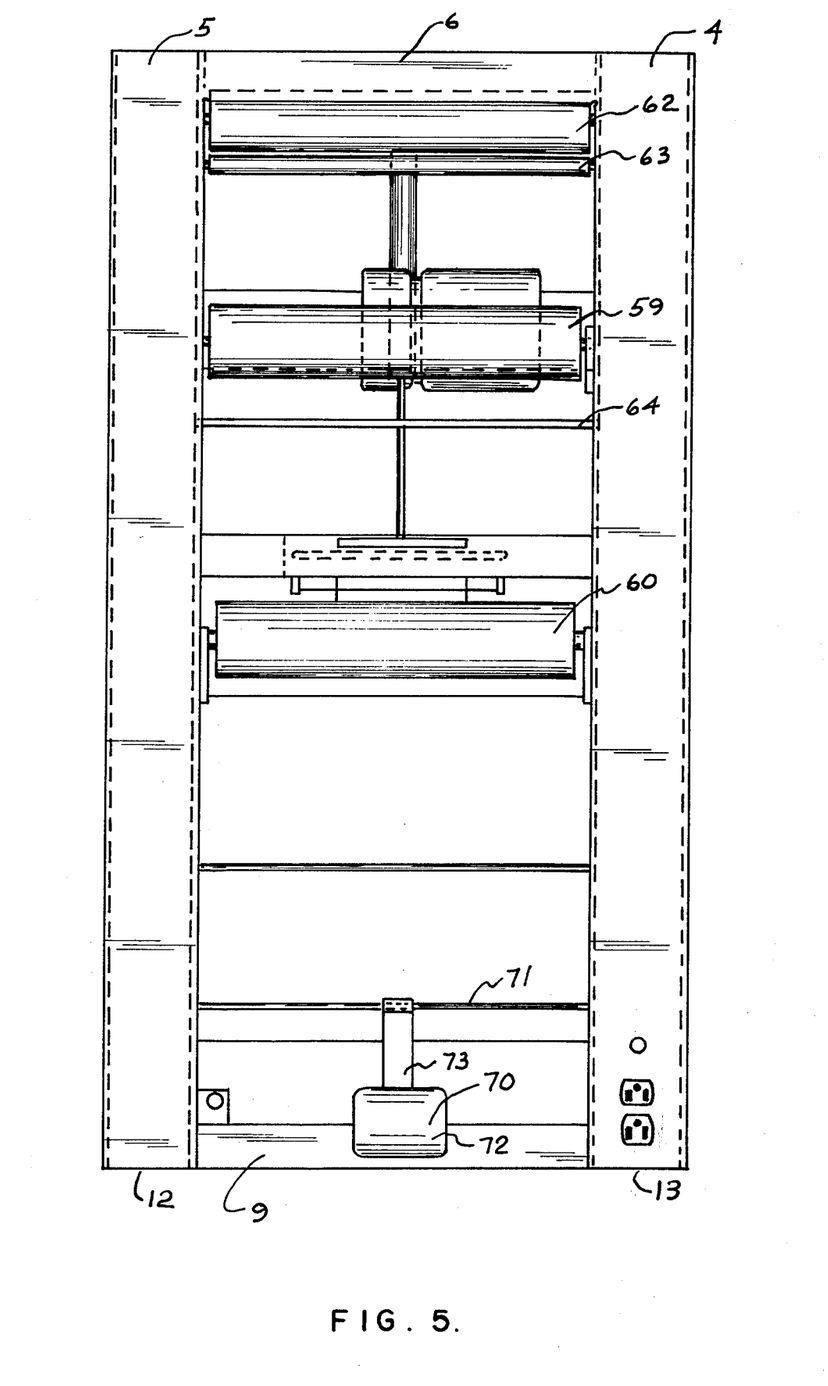
FIG. 5 is a view taken along the line 5—5 of FIG. 3.
Figure 6:
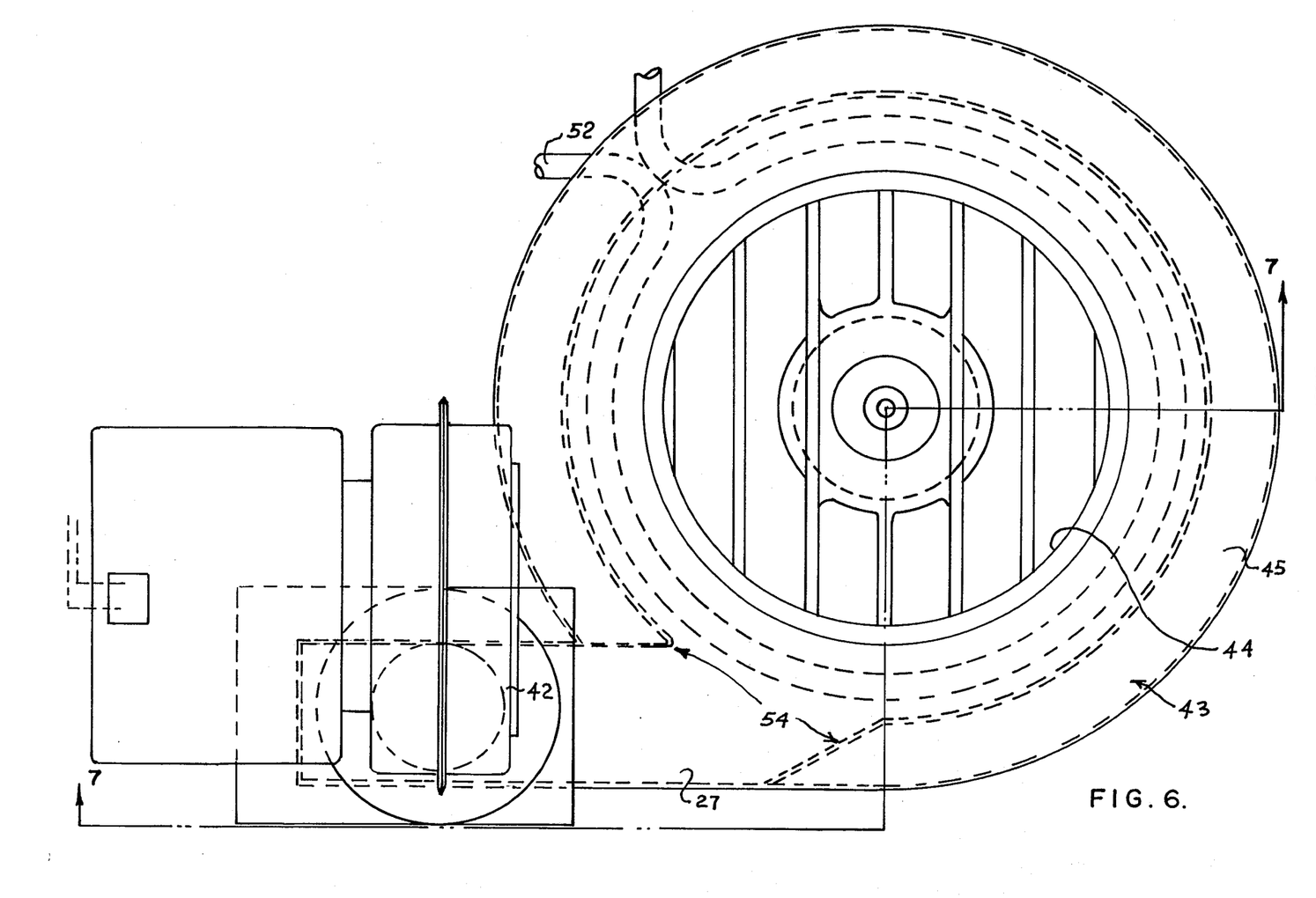
FIG. 6 is an enlarged view, partly broken away, taken along the line 6—6 of FIG. 4.

Referring now to FIG. 5, a guide arm 70 is rotatably mounted to a bar 71. Guard arm 70 includes a pad 72 and a support 73. The guide arm 70, in FIG. 5, is shown in a down position. The support 73 is an arcuate strip of metal or other suitable material folded about or otherwise suitably attached to bar 71 so as to permit rotation of the guide arm 70. In use, guide arm 70 is rotated upwardly. It is sized so as to permit the pad 72 to engage the feed roller 60.

Figure 1:
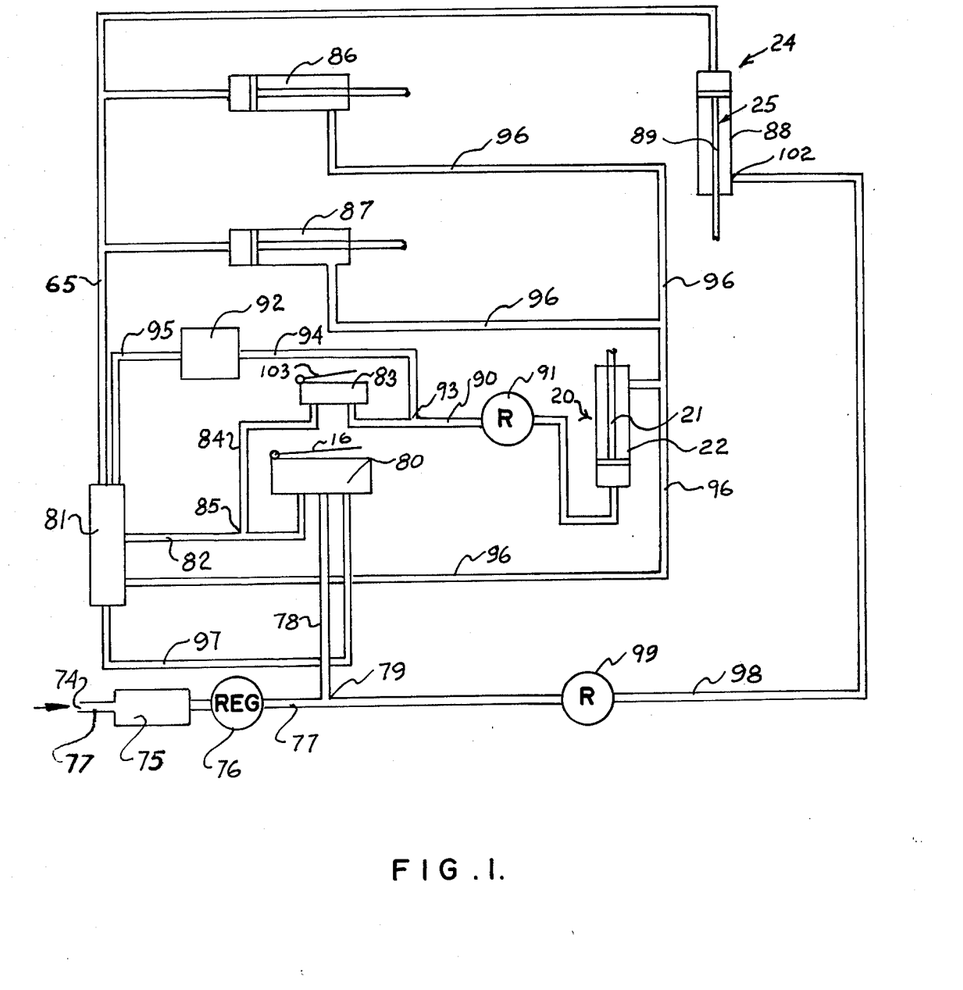
FIG. 1 is a diagrammatic representation for a fluid drive system used in conjunction with apparatus of this invention.
Figure 2:
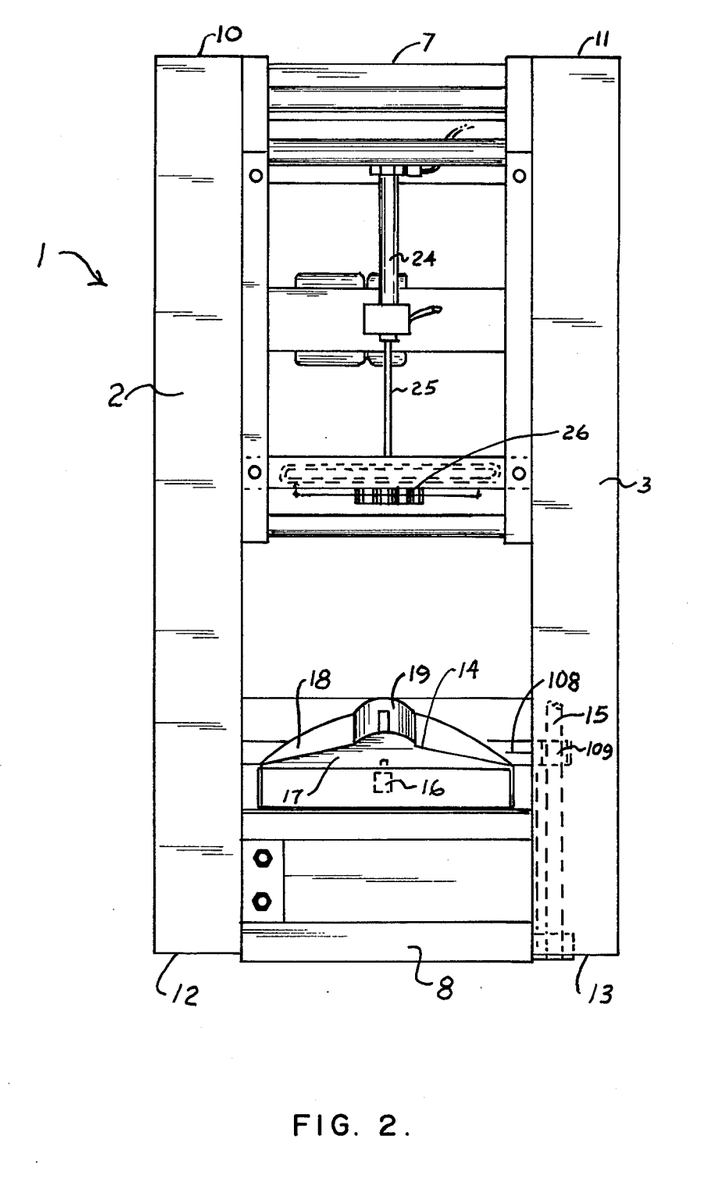
FIG. 2 is a front view of the apparatus of this invention.
Figure 3:
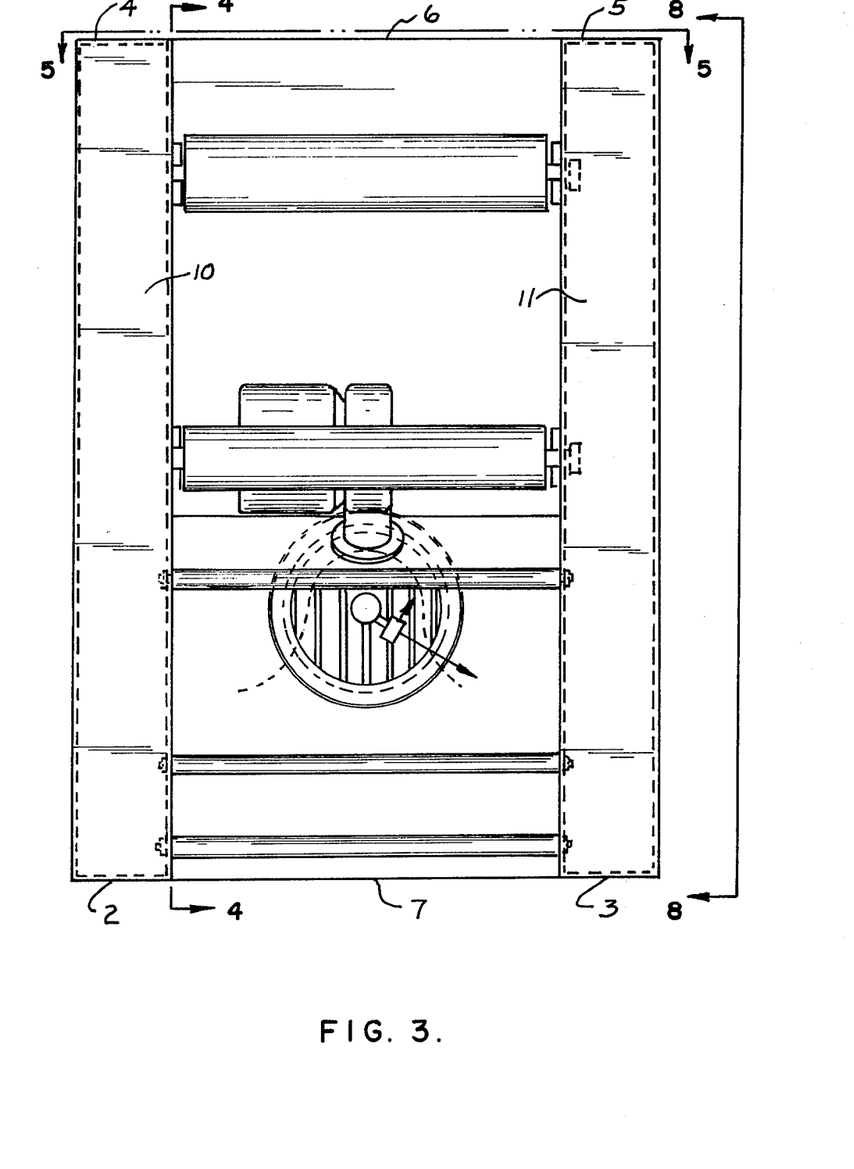
FIG. 3 is a top plan view of the apparatus shown in FIG. 2.
Figure 4:
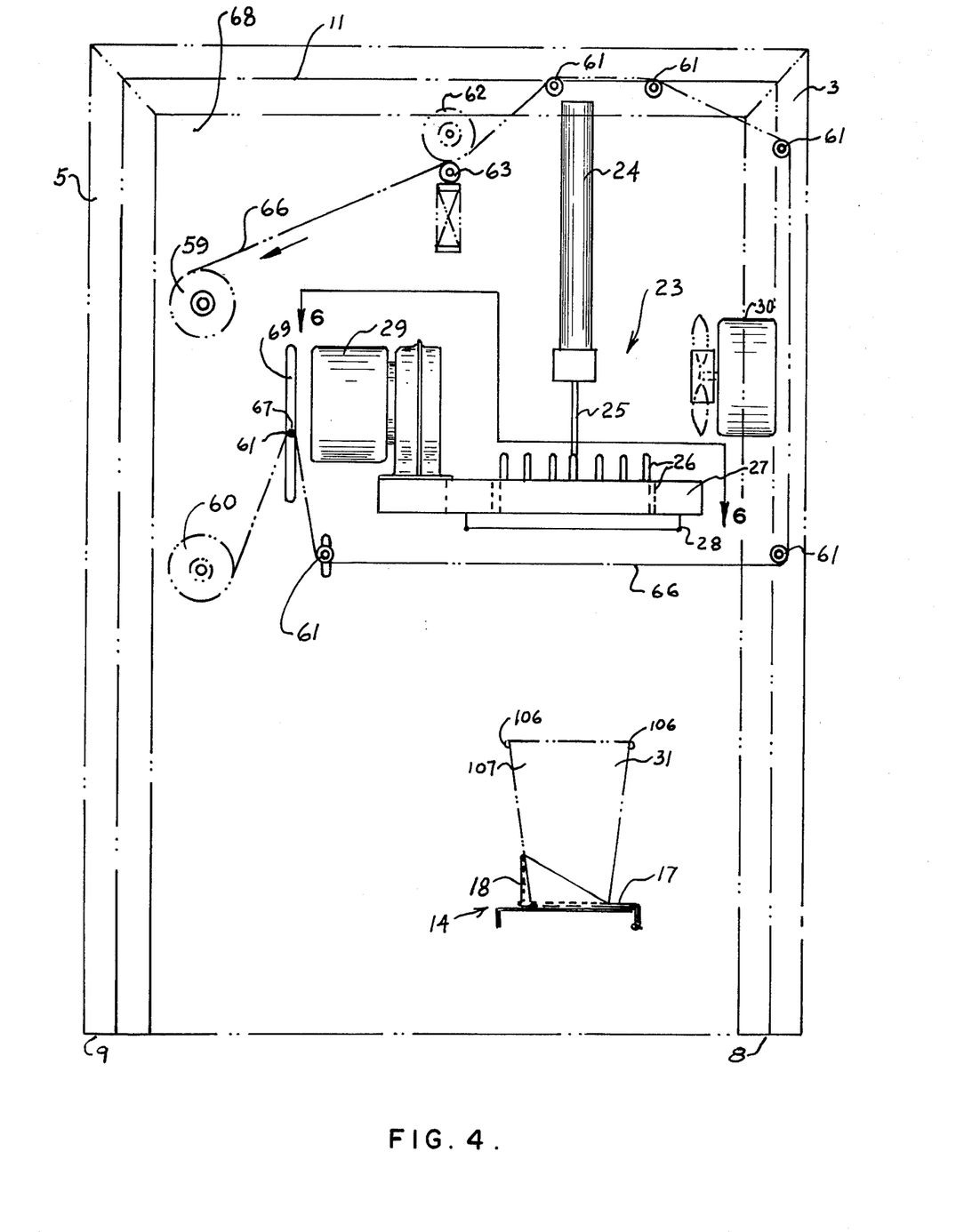
FIG. 4 is a sectional view taken along the line 4—4 of FIG. 3.

Operation of the machine 1 is best understood by referring to the diagrammatic representation of FIG. 1. As there illustrated, a source of pneumatic power, not shown, is connected to an inlet 74 of a pneumatic line 77 which is positioned at any convenient location on the machine 1 structure. A filter 75 and a pressure regulator 76 are connected in the pneumatic line 77. A pneumatic line 78 has a first end connected to the line 77 at a point 79 and a second end connected to a pneumatic switch 80. Switch 80 is controlled by the switch actuator 16, previously described in conjunction with cup platform 14. Energizing switch actuator 16 permits the application of power to a four-way pneumatic valve 81 through a pneumatic line 82.

The input side of a switch 83 also is connected to line 82 at a connection point 85 via a pneumatic line 84.

The output side of switch 83 is connected to the cup drive means 20 by a pneumatic line 90. Line 90 has a regulator 91 connected in it, between the switch 83 and the drive means 20. Regulator 91 is conventional and is utilized to ensure correct pressure on piston 21 so that the cup 31 is stopped automatically by the pressure differential between the drive means 20 and the stop means 24, described below. A timing means 92 is connected to line 90 at a connection point 93 between the output side of switch 83 and the regulator 91, by a pneumatic line 94. The output of timing means 92 is connected to four-way pneumatic valve 81 by a line 95.

An output line 65 from the pneumatic valve 81 is connected to a feed hydraulic actuator 86, a take up hydraulic actuator 87 and stop means 24.

The output sides of actuators 86, 87 and drive means 20 are connected, via line 96 to valve 81. A reset line 97 is connected between valve 81 and switch 80.

A pneumatic line 98 has a regulator 99 mounted in it and the line 98 is connected between connection point 79 and a second side connection point 102 in the output side of cylinder 88 of stop means 24. The drive means 20 and stop means 24, in the actual embodiment, have their respective pistons 21 and 25 and associated rods aligned axially although such alignment is not shown in FIG. 1. Switch 83 also is positioned so that either actuator 86 or 87 strikes an energizer 103 of the switch 83 after a predetermined distance of travel of the piston for either actuator. Actuators 86, 87, drive means 20 and stop means 24 are conventional pneumatic cylinder, rod and piston arrangements. I also find it convenient to use rack and pinion linkages 104 and 105 for driving feed and take up mechanism for the film 66.

Operation of machine 1 is extremely simple and efficient. Placement of cup 31 actuates switch 80 and permits application of pneumatic power to valve 81. Valve 81 in turn allows power application to actuators 86, 87 and stop means 24. It should be noted that application of power to stop means 24 would force guide 26 to an extreme downward position. Line 98 applies a counter balance force to the piston 25 so as to raise the guard 26 to its proper position. Actuators 86 and 87 drive the rack and pinion mechanism 104 and 105 which advances a new reach of film 66 beneath wrap cutting means 28, the film being drawn between the cup 31 and the cutting means 28. A predetermined distance of travel of actuator 86 and 87 will cause either rack and pinion mechanism 104 and 105 to strike energizer 103 of switch 83. Actuation of switch 83 applies pneumatic power to drive means 20 and the piston 21 starts the movement of cup platform 14.

As cup travel continues, the cup 31 engages film 66 and carries that film against cutting means 28. Cutting means 28 severs a desired portion of film 66. In the particular embodiment illustrated, cutting means 28 is a generally circular or eliptical wire electrically connected to a source of electrical energy, not shown. Cutting means 28 easily severs a portion of the film 66 as the cup 31 draws the film against it. The severed portion of the film 66 is carried by and settles about a top portion 107 of cup 31. The film-cup combination meets guard 26 so that a lip 106 of the cup 31 is exposed beneath the lower surface 58 of the flange 36 while the top of the cup 31 is protected within cup cavity 33.

The guard and cup-film combination continue upwardly until the proper relationship within the tunnel 27 is attained. This relationship is governed by the resultant pneumatic pressures exerted by the oppositely directed and axially aligned stop means 24 and drive means 20. The relationship is adjusted by proper settings on the regulators 76, 91 and 99. It should be noted, however, that upward cup travel is stopped by this balancing of pressures and that no fixed stop is required in the machine 1. Certain embodiments of this invention may use a mechanical step, not shown, to insure that guard 26 is positioned properly during each cycle. Consequently, a variety of cup sizes are compatible with the machine 1. Proper positioning within tunnel 27 is accomplished merely by adjusting pressure differentials within the pneumatic system.

As the cup seats itself within cavity 33, puncture means 38 may be provided to slit a small relief opening in the film 66 covering the cup 31.

Once the cup is positioned properly within the heat tunnel 27, novel construction of the baffle system 54, together with the design of the lower surface 58 of flange 36, directs hot air against that portion of the film 66 which overlays upper portion 107 of cup 31. This hot air flow quickly shrinks the film 66, sealing the cup along the lip portion 106. The guard 26 protects that portion of the film 66 covering the top of cup 31 while heat shrinking of the remaining film is in progress. I have found that the fan 30 positioned so as to direct a volume of air across the fins 39 materially aids in heat removal and prevents shrinkage of that portion of the wrap 66 covering the top of the cup 31.

After a predetermined interval of time, which may be adjusted as necessary, timing means 92 opens. Opening of timing means 92 removes input pressure from drive means 20 via the lines 94 and 95. Due to this pressure loss, the cup platform 14 begins lowering to its initial position. The opening of timing means 92 also applies pressure to valve 81 via the line 95 which is sufficient to reverse that valve. Reversal of valve 81 removes input power from the actuators 86 and 87. In fact, reversal of valve 81 applies a positive pressure on their respective pistons, via the line 96, which quickly returns them to their initial position. Removal of the cup 31 resets the switch 80 by applying pressure to the switch via the line 97, and the apparatus is ready for the initiation of the next operating cycle.

Numerous variations, within the scope of the appended claims will be apparent to those skilled in the art in light of the foregoing description and accompanying drawings. Thus, the design of the various structural members of the skeleton frame may be changed. The apparatus may be provided with a decorative and function assisting enclosure. The design of cup supporting platform 14 may be varied. For example, the crevice 19 may be eliminated or redesigned in other embodiments of this invention. Various conventional components of the apparatus may be changed. Thus, other mechanical apparatus may replace the rack and pinion devices utilized in the embodiment illustrated. Likewise, changes may be made in the pneumatic system which powers the apparatus of the invention. For example, while the floating stop described above is preferable, a mechanical stop may be provided to halt cup movement. The design of the fins 39 may be changed. The fan 30 may be eliminated in certain applications of the apparatus. While the machine 1 is described as being powered from a pneumatic source, other fluid or other power sources may be utilized for this purpose. These variations are merely illustrative.

I claim:

1. A capping machine for closing an open end of a cup including a fluid drive system for operating said machine from a source of fluid power, comprising:
   on-off switch means for actuating said machine responsive to said cup placement in said machine;
   valve means for controlling said drive system connected to said on-off switch means;
   first actuator means connected to said valve means;
   second actuator means connected to said valve means;
   switch means responsible to travel of at least one of said first and said second actuator means;
   cup drive means connected to said switch means and responsive to energization thereof; and
   timer means connected between said last mentioned switch means and said valve means for reversing said valve means after a predetermined elapsed time period, said valve means reversal acting to return said cup drive means, said first actuator and said second actuator to an initial position.

2. The capping machine of claim 1 further characterized by stop means connected to said valve means and aligned axially with said cup drive means but directed oppositely thereto wherein said cup drive means and said stop means are allowed to said counter balance one another in at least one position of cup drive means.

3. The capping machine of claim 2 further characterized by a heat shrink station positioned between said stop means and said cup drive means.

4. The capping machine of claim 3 wherein said stop means has a guard operatively connected to it.

5. The capping machine of claim 4 wherein said heat shrink station further comprises a heat tunnel having a top wall, a bottom wall, and a pair of oppositely opposed side walls connected to said top and bottom walls, said heat tunnel having an axial opening through it, one of said side walls being disposed annularly about said axial opening.

6. The capping machine of claim 5 wherein said top wall, said bottom wall, and said side walls define a chamber therebetween, said side wall disposed annularly about said axial opening having a vent in it adapted to direct an air flow in said axial opening from said bottom wall toward said top wall.

7. The capping machine of claim 6 further characterized by heater means carried by said heat tunnel in said chamber and a blower having an output side adapted to direct air through said chamber.

8. The capping machine of claim 7 further characterized by means for advancing a length of heat shrinkable film between said bottom wall of said heat tunnel and said cup drive means.

9. The capping machine of claim 8 further characterized by cutter means for severing a portion of said heat shrinkable film, said cutter means comprising an electrical resistance wire carried along but spaced from said bottom wall of said heat tunnel.

10. In a capping machine having a film advance system for advancing a length of heat shrinkable film, means for advancing a container to engage said film, and means for cutting said film in response to cup-film movement, the improvement comprising a heat tunnel for shrinking said film, said heat tunnel including a top wall having an opening in it, a bottom wall parallel to said top wall, said bottom wall having an opening in it which aligns with the opening of said top wall, a first side wall connected from and between said top and bottom walls along the perimeter of said top and said bottom walls, and a second side wall connected from and between said top and said bottom walls along the radially outer edge of said openings in said top and said bottom walls so as to define an axial channel through at least a substantial length of said heat tunnel for receiving said cup and film combination, and a baffle system mounted to in said tunnel, said baffle system being adapted to direct a current of heated air upwardly toward the top of said container from the bottom of said container, said second wall having a part which defines a portion of said baffle system.

11. The improvement of claim 10 wherein said capping machine is pneumatically operated and is further characterized by means for protecting the heat shrinkable film covering the open mouth of said container.

12. The improvement of claim 11 wherein said means for protecting the heat shrinkable film comprises a guard having a cylindrical body portion and an outwardly extending radial flange portion, said guard being adapted to close one end of said axial channel during heat shrinking operations.

13. In a capping machine for closing an open end of a container, including means for advancing said container for sealing, means for cutting a film wrap coordinated to cup movement and means for advancing said film wrap coordinated to cup movement, the improvement comprising heat shrinking means, said means comprising a heat tunnel having an inner wall, an outer wall, a top wall and a bottom wall, said heat tunnel having an axial opening in it for receiving the open end of said container, said inner wall being connected between said top and bottom walls along the periphery of said axial opening, said inner wall, said outer wall, said top wall and said bottom wall defining a chamber therebetween; heating means mounted in said chamber, a blower mounted so as to direct air through said chamber and over said heating means, and a baffle mounted in said chamber adapted to direct air from said blower across said heating means, said baffle being V-shaped in cross-section, at least one leg of said V being substantially shorter than the other leg of said V, said short leg extending radially inwardly into said axial opening, said inner wall and said bottom wall being spaced to permit passage of said short leg and to define an opening between said chamber and said axial opening.

14. A capping machine for applying a heat shrinkable film wrap about an open container comprising:
    drive means for actuating said machine responsive to container placement; and
    heating means for shrinking said film wrap, said heating means having an axial opening through it permitting passage of said container, said heating means further including:
        a top wall, a bottom wall spaced from said top wall, a first cylindrical side wall part and a second cylindrical side wall part concentric with said first side wall part, said second cylindrical side wall part together with said top and said bottom walls defining said axial opening through said heating means, said top, said bottom and said first and said second cylindrical side wall parts defining a chamber therebetween;
        a blower mounted to said machine so as to direct a volume of air circumferentially about said first and said second cylindrical side wall parts within said chamber;
        a heating element mounted in said chamber; and
        a baffle system mounted between said first and said second cylindrical side wall parts adapted to direct air movement toward said second cylindrical side wall part, said second cylindrical side wall part including means for directing said air into said axial opening.

15. A capping machine for closing an open end of a container including a drive system for operating said machine from a source of power comprising:
    on-off switch means for actuating said machine, said on-off switch means being responsive to container placement in said machine;
    means for controlling said drive system, said control means being operatively connected to said on-off switch means and being activated by said on-off switch means;
    first actuator means for advancing a reach of shrinkable film operatively connected to said control means and operated thereby;
    second actuator means for collecting unused portions of said shrinkable film reach operatively connected to said control means and operated thereby;
    switch means responsive to travel of at least one of said first and said second actuator means;
    cup drive means connected to said switch means and responsive to energization thereof; and
    means for timing the operation of said cup drive means operatively connected between said last mentioned switch means and said control means for resetting said control means after a predetermined lapse period of time, the resetting of said control means acting to return said cup drive means, said first actuator and said second actuator to an initial condition.

16. The capping machine of claim 15 further characterized by stop means operatively connected to said control means for preventing cup movement after a predetermined distance of cup travel.

17. The capping machine of claim 16 wherein said power source is a fluid power source, said control means comprising a fluid operated valve, said stop means comprising a hydraulic cylinder operatively connected to said control means and aligned axially with said cup drive means but directed oppositely thereto so that said stop means counter balances the drive force of said cup drive means in at least one position of said cup drive means.

18. The capping machine of claim 16 further characterized by a heat shrink station positioned between said stop means and said cup drive means.

19. The capping machine of claim 18 wherein said heat shrink station further comprises a heat tunnel having a top wall, a bottom wall and a pair of oppositely opposed side walls connected to said top and said bottom walls, said heat tunnel having an axial opening through it, one of said side walls being disposed annularly about said axial opening.

* * * * *